(12) United States Patent
Mongoin et al.

(10) Patent No.: US 10,233,330 B2
(45) Date of Patent: Mar. 19, 2019

(54) DISPERSION AND/OR GRINDING AID AGENTS OF KAOLIN IN AQUEOUS SUSPENSION, AQUEOUS SUSPENSIONS OBTAINED AND USES THEREOF

(71) Applicant: COATEX, Genay (FR)

(72) Inventors: Jacques Mongoin, Quincieux (FR); Christian Jacquemet, Lyons (FR); Yves Matter, Quincieux (FR); Jean-Marc Suau, Lucenay (FR)

(73) Assignee: COATEX, Genay (FR)

( * ) Notice: Subject to any disclaimer, the term of this patent is extended or adjusted under 35 U.S.C. 154(b) by 0 days.

(21) Appl. No.: 15/528,270

(22) PCT Filed: Dec. 1, 2015

(86) PCT No.: PCT/FR2015/053275
§ 371 (c)(1),
(2) Date: May 19, 2017

(87) PCT Pub. No.: WO2016/087765
PCT Pub. Date: Jun. 9, 2016

(65) Prior Publication Data
US 2017/0355856 A1    Dec. 14, 2017

(30) Foreign Application Priority Data

Dec. 3, 2014  (FR) ..................... 14 61845

(51) Int. Cl.
*C09C 1/42*  (2006.01)
*C09C 3/06*  (2006.01)
*C09C 3/10*  (2006.01)

(52) U.S. Cl.
CPC .......... *C09C 1/42* (2013.01); *C09C 3/06* (2013.01); *C09C 3/10* (2013.01)

(58) Field of Classification Search
CPC ............... C09C 1/42; C09C 3/10; C09C 3/06
USPC ........................................................ 524/401
See application file for complete search history.

(56) References Cited

U.S. PATENT DOCUMENTS

| | | | | |
|---|---|---|---|---|
| 4,742,105 | A * | 5/1988 | Kelley ................. | C08K 3/34 524/447 |
| 6,390,301 | B1 * | 5/2002 | Nagaraj ................ | B03B 1/04 209/3 |
| 2001/0022282 | A1 | 9/2001 | Nagaraj et al. | |
| 2008/0146715 | A1 * | 6/2008 | Yuan .................... | C09C 1/021 524/425 |

OTHER PUBLICATIONS

International Search Report dated Mar. 18, 2016, in PCT/FR2015/053275 filed Dec. 1, 2015.

* cited by examiner

*Primary Examiner* — Michael Bernshteyn
(74) *Attorney, Agent, or Firm* — Oblon, McClelland, Maier & Neustadt, L.L.P.

(57) ABSTRACT

The present invention relates to a ternary mixture consisting of at least one homopolymer or copolymer of (meth)acrylic acid, partially or completely neutralized with sodium, with potassium, with lithium and/or with an amine, at least one solution of silicate or metasilicate chosen from the group consisting of a sodium silicate of formula $Na_2O.nSiO_2$ (with n varying between 1 and 4), sodium metasilicate $Na_2SiO_3$, a potassium silicate $K_2O.nSiO_2$ (with n varying between 1 and 4), potassium metasilicate $K_2SiO_3$ and a mixture of these compounds, and at least one base, as dispersion and/or grinding aid agents of kaolin in aqueous suspension.

9 Claims, 1 Drawing Sheet

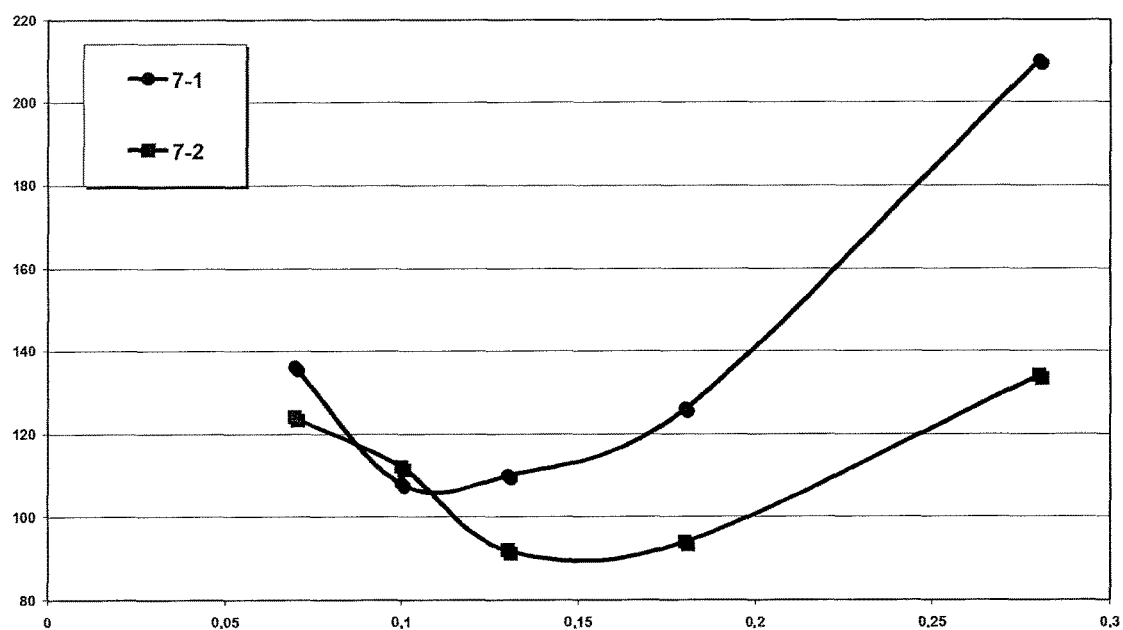

"DISPERSION AND/OR GRINDING AID AGENTS OF KAOLIN IN AQUEOUS SUSPENSION, AQUEOUS SUSPENSIONS OBTAINED AND USES THEREOF"

The present invention relates to the technical field of dispersion and/or grinding aid agents of kaolin in aqueous suspension.

More specifically, the present invention relates to a ternary mixture consisting of at least one homopolymer or copolymer of (meth)acrylic acid, partially or completely neutralized with sodium, with potassium, with lithium and/or with an amine, at least one solution of silicate or metasilicate chosen from the group consisting of sodium silicate of formula $Na_2O.nSiO_2$ (with n varying between 1 and 4), a sodium metasilicate $Na_2SiO_3$ and/or a potassium silicate $K_2O.nSiO_2$ (with n varying between 1 and 4), potassium metasilicate $K_2SiO_3$ and at least one base, as dispersion and/or grinding aid agents of kaolin in aqueous suspension. These silicates make it possible to reduce the amount of homopolymers or copolymers of (meth)acrylic acid employed, for an equivalent level of performance as regards rheology and particle size distribution of the suspensions.

Kaolin is an inorganic pigment conventionally obtained by ore extraction, grinding, delamination methods and then optionally treatment and classification methods. Kaolin is used as filler in paper for preparing paper coating colours, and as pigment in paints, rubber, resins, etc. Kaolin is found in the form of a dry powder or in the form of an aqueous dispersion or suspension. Kaolin is, for example, introduced into the coating colour in the form of an aqueous dispersion or suspension having, for economical and technical reasons, a high solids content: at least 60%, preferably 70%, very preferably 72% by dry weight of kaolin. "Solids content" is understood to mean the content by dry weight of kaolin, with respect to the total weight of the aqueous suspension or dispersion under consideration.

Kaolin, just like mineral matters generally, has to be treated before being able to be used. For example, it has to be ground to give fine and/or homogeneous particles. The methods for grinding mineral matters, such as kaolin, are known to be highly energy consuming. Solutions targeted at increasing the grinding yields are continually being sought. From this viewpoint, it is generally useful to employ grinding additives, known as "grinding aid agents". These additives, introduced during the stage of grinding of these minerals, are used to facilitate the grinding method, to help in the process of reducing the sizes of the particles and to increase the capacity and the efficiency of the grinding method.

Also, when the kaolin particles are in suspension in water, they have a tendency to spontaneously agglomerate. A "dispersing aid agent" is then used to disperse them and to maintain a steric repulsion between the particles.

The document WO 2006/081501 describes the use of a partially neutralized anionic dispersant and of an inorganic dispersant for preparing suspensions of mineral matters (kaolin, $CaCO_3$ and talc).

The patent U.S. Pat. No. 4,742,105 for its part describes binary deflocculation compositions for aqueous kaolin suspensions consisting of a binary mixture of a sodium silicate and of a sodium, potassium or ammonium polyacrylate with a molecular weight lying between 2000 g/mol and 10,000 g/mol. Such binary compositions are presented as having a viscosity which is controlled and stable over time, at ambient temperature and also at elevated temperatures.

Nevertheless, the inventors have realized that such a binary mixture has a major problem of sedimentation, this problem being magnified over time and also with an increase in the temperatures. "Sedimentation" is understood to mean a deposition at the bottom of the vessels of a portion of the constituents of the binary mixture which makes it difficult, indeed even impossible, to pump them.

The problem of sedimentation is far from being an insignificant problem in the technical field. This is because it turns out that dispersing or grinding aid agents have to exhibit a degree of stability over time and at more or less elevated temperatures as they are generally used on sites remote from their place of production. Thus, these agents have to remain stable (that is to say, not result in any sedimentation during their storage and their transportation), over a period of at least 15 days and at ambient temperature.

The inventors have thus attempted to solve the technical problem of the sedimentation of the compositions comprising a (meth)acrylic acid polymer and a silicate.

A first object of the present invention relates to a dispersion and/or grinding aid agent of kaolin in aqueous suspension consisting of a ternary mixture:

a) of at least one homopolymer or copolymer of (meth) acrylic acid, partially or completely neutralized with sodium, with potassium, with lithium and/or with an amine, b) of at least one solution of silicate or metasilicate chosen from the group consisting of sodium silicate of formula $Na_2O.nSiO_2$ (with n varying between 1 and 4), sodium metasilicate $Na_2SiO_3$, potassium silicate $K_2O.nSiO_2$ (with n varying between 1 and 4), potassium metasilicate $K_2SiO_3$ and a mixture of these compounds and c) of at least one base, in an amount such that it is in excess of at least 2 mol % with respect to the theoretical amount of base necessary for the complete neutralization of said homopolymer or copolymer of (meth) acrylic acid, in which the homopolymer/copolymer:silicate/metasilicate ratio by weight (dry weight) is between 20:80 and 80:20.

The application U.S. Pat. No. 6,390,301 describes a method which makes it possible to separate the impurities of chalks using a homopolymer of acrylic acid and a sodium silicate, in mass ratios remote from those of the present invention. This application is silent with regard to the neutralization of the polyacrylate.

The inventors have realized that the addition of a base was necessary in order to prepare said dispersion and/or grinding aid agent of kaolin according to the invention without a rapid, indeed even instantaneous, precipitation or a sedimentation being produced. This is because, when a homopolymer/copolymer of (meth)acrylic acid, for example neutralized with sodium, is mixed with a sodium silicate, there is instantaneously precipitation. This precipitation does not take place when the silicate or metasilicate furthermore comprises a base in an excess amount with respect to a complete neutralization of said polymer.

The prior art does not in the least indicate the importance of the addition of a base in such an amount in order to solve the technical problem of the precipitation and/or of the sedimentation.

According to the present invention, the amount of base to be added to the mixture, more precisely to be added to the silicate or metasilicate solution, is calculated with respect to the total number of moles of acid functional groups of the homopolymer or copolymer of (meth)acrylic acid present in the mixture. This amount has to be such that, on the one hand, all of the acid functional groups of said polymer are neutralized and that, on the other hand, at least 2 mol % (with respect to the total number of acid functional groups carried by the polymer present in the mixture) of free base remain in the mixture.

"Acid functional groups" is understood to mean the carboxylic acid —COOH functional groups in the case of a polymer of (meth)acrylic acid.

The amount of base to be added to the mixture depends on the degree of neutralization of the polymer used. When this polymer is partially neutralized, an amount of base is added such that all of the acid functional groups of said polymer are neutralized, and also an additional amount of at least 2 mol %, with respect to the total number of acid functional groups carried by the polymer present in the mixture, is added.

When this polymer is completely neutralized, an additional amount of base of at least 2 mol % with respect to the total number of acid functional groups carried by the polymer present in the mixture, is added.

As explained later, the person skilled in the art knows how to calculate or evaluate the theoretical amount of base necessary for the complete neutralization of a homopolymer or copolymer of (meth)acrylic acid.

It is possible to envisage, in the context of the present invention, the use of a different base from that which was used to partially or completely neutralize the polymer constituting a portion of the mixture.

According to another embodiment, the dispersion and/or grinding aid agent of the kaolin in aqueous suspension according to the present invention contains a base selected from the group consisting of sodium hydroxide, potassium hydroxide, lithium hydroxide, an amine or a mixture of these bases.

They can be added in the form of solutions, but also in the form of pellets or in the form of a powder.

According to one embodiment of the present invention, the homopolymer or copolymer of (meth)acrylic acid is partially or completely neutralized with the same base as that used to prepare the ternary mixture according to the present invention.

According to one embodiment of the present invention, the ternary mixture contains an excess amount of base which is sodium hydroxide (NaOH).

According to one embodiment, the amount of base is such that it is in excess of at least 5 mol % with respect to the theoretical amount of base necessary for the complete neutralization of said homopolymer or copolymer of (meth) acrylic acid, for example of at least 7 mol % or of at least 10 mol %.

The mixture according to the invention contains at least one solution of silicate or metasilicate chosen from the group consisting of sodium silicate of formula $Na_2O.nSiO_2$ (with n varying between 1 and 4), sodium metasilicate $Na_2SiO_3$, potassium silicate $K_2O.nSiO_2$ (with n varying between 1 and 4), potassium metasilicate $K_2SiO_3$ and a mixture of these compounds.

These products are commercially available. Mention is made, for example, of the Nasil® products from the company IQE, in the solid form and in the aqueous form.

The aqueous silicate solutions can in particular be prepared from the solid silicate forms by dissolution in aqueous solutions, for example in water.

The solids content of the aqueous silicate solutions is typically 46% by weight ±6%.

According to one embodiment of the present invention, said silicate is a sodium silicate of formula $Na_2O.2SiO_2$ (formula $Na_2O.nSiO_2$ with n equal to 2).

The pH of the dispersion and/or grinding aid agent of kaolin in aqueous suspension according to the invention is basic. According to one embodiment, the dispersion and/or grinding aid agent of kaolin in aqueous suspension according to the present invention has a pH of greater than or equal to 10, 10.5 or 11, for example of greater than or equal to 11.5.

It should be noted that the pH of the silicate solutions used in the context of the present invention varies between 10 and 13. Thus, the pH of the dispersing and/or grinding agent according to the invention is largely dependent on the amount of silicate involved in the ternary mixture.

According to one embodiment, the homopolymer/copolymer:silicate/metasilicate ratio by weight (dry weight) is between 20:80 and 80:20.

The polymer of (meth)acrylic acid is generally in the form of an aqueous solution, the solids content of which varies between 20% and 60% by dry weight.

Said ratio by weight is calculated on the basis of the dry weights of the two constituents. According to another embodiment, the homopolymer/copolymer:silicate/metasilicate ratio by weight is between 30:70 and 70:30 or also between 40:60 and 60:40. This ratio is, for example, 50:50, that is to say that the dispersion and/or grinding aid agent according to the present invention comprises approximately the same amount by weight of homopolymers or copolymers of (meth)acrylic acid, partially or completely neutralized with sodium, with potassium, with lithium and/or with an amine (for example, 2-amino-2-methylpropanol, triethanolamine, etc), and of solution of silicate or metasilicate chosen from the group consisting of sodium silicate of formula $Na_2O.nSiO_2$ (with n varying between 1 and 4), a sodium metasilicate $Na_2SiO_3$, potassium metasilicate $K_2SiO_3$ and/or a potassium silicate $K_2O.nSiO_2$ (with n varying between 1 and 4). "Approximately" is understood to mean that the respective amounts of the constituents are identical to ±5% by dry weight.

One of the essential constituents of the ternary mixture lies in the presence of a homopolymer or copolymer of (meth)acrylic acid.

"Homopolymer or copolymer of (meth)acrylic acid" is understood to mean either a polymer consisting exclusively of acrylic acid (acrylic acid homopolymer) or a polymer consisting exclusively of methacrylic acid (methacrylic acid homopolymer) or alternatively a polymer consisting of a mixture of acrylic acid and of methacrylic acid (acrylic acid/methacrylic acid copolymer). In the latter case, according to one aspect of the invention, the molar ratio of acrylic acid monomers to methacrylic acid monomers can vary between 1:100 and 100:1, for example between 1:1 and 100:1 or between 1:1 and 50:1.

Furthermore, the copolymer according to the invention can also comprise, in addition, one or more other ethylenically unsaturated monomer(s) chosen from the group consisting of itaconic acid, crotonic acid, fumaric acid, maleic acid, maleic anhydride, isocrotonic anhydride, aconitic anhydride, mesaconic anhydride, sinapic anhydride, undecylenic anhydride, angelic anhydride, 2-acrylamido-2-methylpropanesulfonic acid (AMPS), sodium methallylsulfonate, acrylamide and methacrylamide.

In the latter case, according to one aspect of the invention, the molar ratio of (meth)acrylic acid monomers to other unsaturated monomer(s) can vary between 1:1 and 100:1, for example between 1:1 and 75:1 or between 1:1 and 50:1.

Said homopolymer or copolymer of (meth)acrylic acid can be obtained by any radical polymerization method, for example in solution, in direct or inverse emulsion, in suspension or in precipitation from appropriate solvents, in the presence of catalytic systems and of transfer agents. It can be a controlled radical polymerization method, for example controlled by nitroxides (NMP) or cobaloximes, or an atom transfer radical polymerization (ATRP) method. Mention is also made of radical polymerization methods controlled by sulfur derivatives chosen from carbamates, dithioesters, trithiocarbonates (RAFT) and xanthates.

Use may be made, for example, of hydrogen peroxide or of persulfate, which acts as initiator, and also, for example, of copper sulfate, which acts as catalyst and chain transfer agent.

Alternatively, use is made, for example, of thiolactic acid or another mercaptan as additional chain transfer agent or secondary alcohols.

Yet other methods have resorted to sodium hypophosphite, of chemical formula $NaPO_2H_2$, as chain transfer and oxidation/reduction agent, in the presence of hydrogen peroxide or of generator of radicals.

In this respect, reference is made in particular to the following documents, which describe various methods for the radical polymerization of acrylic acid: WO 02/070571, WO 2005/095466, WO 2006/024706 and WO 2014/049252.

Polymers of (meth)acrylic acid are generally characterized by two indices/quantities/values:
 the polymolecularity PD index (also referred to equivalently as polydispersity PI) and
 the molecular mass Mw (also referred to equivalently as molar mass or as molecular weight), expressed in g/mol.

The polydispersity index corresponds to the distribution of the molar masses of the different macromolecules within the (meth)acrylic acid polymer. If all the macromolecules have one and the same degree of polymerization (thus one and the same molecular mass), this index is close to 1. If, on the other hand, the macromolecules have different degrees of polymerization (thus different molecular masses), the PI index is greater than 1. The closer the PI index of the polymer to 1, the more effective the polymer in its various applications.

According to one embodiment, said homopolymer or copolymer of (meth)acrylic acid has a molecular weight of less than or equal to 7 000 g/mol, as measured by Size Exclusion Chromatography (SEC) or Gel Permeation Chromatography (GPC).

Such a technique conventionally employs a liquid chromatography device of WATERS™ brand equipped with a detector. The latter is a refractometric concentration detector of WATERS™ brand.

This liquid chromatography device has a size exclusion column suitably chosen by the person skilled in the art in order to separate the different molecular weights of the polymers studied.

The liquid elution phase is an aqueous phase adjusted to pH 9 with 1N sodium hydroxide solution containing 0.05M of $NaHCO_3$, 0.1M of $NaNO_3$, 0.02M of triethanolamine and 0.03% of $NaN_3$.

In a detailed manner, according to a first stage, the polymerization solution is diluted to 0.9% dry in the dissolution solvent for the SEC, which corresponds to the liquid elution phase of the SEC, to which 0.04% of dimethylformamide, which acts as marker of flow rate or internal standard, is added. Filtration through a 0.2 μm filter is then carried out. 100 μL are subsequently injected into the chromatography device (eluent: an aqueous phase adjusted to pH 9 with 1N sodium hydroxide solution containing 0.05M of $NaHCO_3$, 0.1M of $NaNO_3$, 0.02M of triethanolamine and 0.03% of $NaN_3$).

The liquid chromatography device contains an isocratic pump (WATERS™ 515), the flow rate of which is adjusted to 0.8 mL/min. The chromatography device also comprises an oven which itself comprises, in series, the following system of columns: a precolumn of ULTRAHYDROGEL GUARD COLUMN WATERS™ type with a length of 6 cm and an internal diameter of 40 mm and a linear column of ULTRAHYDROGEL WATERS™ type with a length of 30 cm and an internal diameter of 7.8 mm. The detection system, for its part, is composed of a refractometric detector of RI WATERS™ 410 type. The oven is brought to a temperature of 60° C. and the refractometer is brought to a temperature of 45° C.

The chromatography device is calibrated with sodium polyacrylate powder standards with different molecular masses certified by the supplier: POLYMER STANDARD SERVICE OR AMERICAN POLYMER STANDARDS CORPORATION.

According to one embodiment, said homopolymer or copolymer of (meth)acrylic acid has a molecular weight of less than or equal to 6 000 g/mol, as measured by SEC, for example of less than or equal to 5 000 g/mol.

According to one embodiment, said homopolymer or copolymer of (meth)acrylic acid has a molecular weight of less than or equal to 3 000 g/mol, as measured by SEC, for example of the order of 2 500 g/mol or of 2 000 g/mol.

According to one embodiment, said homopolymer or copolymer of (meth)acrylic acid has a molecular weight ranging from 1 100 g/mol to 7 000 g/mol, advantageously from 1 100 g/mol to 6 000 g/mol, more advantageously from 1 100 g/mol to 5 000 g/mol and more advantageously still from 1 100 g/mol to 3 000 g/mol.

According to one embodiment, said homopolymer or copolymer of (meth)acrylic acid has an index PI of between 1.5 and 3.

The polydispersity index PI of the polymer of (meth)acrylic acid is calculated in the following way: it concerns the ratio of the mass-average molecular mass Mw to the number-average molecular mass Mn.

According to a preferred embodiment of the present invention, the agent consists of a ternary mixture of:
 a) from 20% to 80% by weight of said at least one homopolymer or copolymer of (meth)acrylic acid, partially or completely neutralized with sodium, with potassium, with lithium and/or with an amine,
 b) from 20% to 80% by weight of said at least one solution of silicate or metasilicate chosen from the group consisting of sodium silicate of formula $Na_2O.nSiO_2$ (with n varying between 1 and 4), sodium metasilicate $Na_2SiO_3$, potassium silicate $K_2O.nSiO_2$ (with n varying between 1 and 4), potassium metasilicate $K_2SiO_3$ and a mixture of these compounds and
 c) from 1% to 10% by weight of said at least one base, in which the homopolymer/copolymer:silicate/metasilicate ratio by weight (dry weight) is between 20:80 and 80:20.

According to one embodiment, the dispersion and/or grinding aid agent of kaolin in aqueous suspension consists of a ternary mixture of:
 a) from 40% to 80% by weight of said at least one homopolymer or copolymer of (meth)acrylic acid, partially or completely neutralized with sodium, with potassium, with lithium and/or with an amine, b) from 20% to 60% by weight of said at least one solution of silicate or metasilicate chosen from the group consisting of sodium silicate of formula $Na_2O.nSiO_2$ (with n varying between 1 and 4), sodium metasilicate $Na_2SiO_3$, potassium silicate $K_2O.nSiO_2$ (with n varying between 1 and 4), potassium metasilicate $K_2SiO_3$ and a mixture of these compounds and c) from 1% to 10% by weight of said at least one base, in which the homopolymer/copolymer:silicate/metasilicate ratio by weight (dry weight) is between 20:80 and 80:20.

According to one embodiment, the dispersion and/or grinding aid agent of kaolin in aqueous suspension consists of a ternary mixture of:

a) from 45% to 70% by weight of said at least one homopolymer or copolymer of (meth)acrylic acid, partially or completely neutralized with sodium, with potassium, with lithium and/or with an amine, b) from 30% to 65% by weight of said at least one solution of silicate or metasilicate chosen from the group consisting of sodium silicate of formula $Na_2O.nSiO_2$ (with n varying between 1 and 4), sodium metasilicate $Na_2SiO_3$, potassium silicate $K_2O.nSiO_2$ (with n varying between 1 and 4), potassium metasilicate $K_2SiO_3$ and a mixture of these compounds and c) from 1% to 10% by weight of said at least one base, in which the homopolymer/copolymer:silicate/metasilicate ratio by weight (dry weight) is between 20:80 and 80:20.

According to one embodiment, the dispersion and/or grinding aid agent of kaolin in aqueous suspension consists of a ternary mixture:

a) of a homopolymer of acrylic acid completely neutralized with sodium, with potassium, with lithium and/or with an amine, b) of a solution of sodium silicate of formula $Na_2O.nSiO_2$ (with n varying between 1 and 4) and c) of a base, in which the homopolymer:silicate/metasilicate ratio by weight is between 2:8 and 8:2, advantageously between 3:7 and 7:3.

According to a further embodiment, the dispersion and/or grinding aid agent of kaolin in aqueous suspension consists of a ternary mixture:

a) of a homopolymer of acrylic acid completely neutralized with sodium, b) of a solution of sodium silicate of formula $Na_2O.2SiO_2$ and c) of sodium hydroxide, in an amount such that it is in excess of at least 2 mol % with respect to the theoretical amount of base necessary for the complete neutralization of said homopolymer or copolymer of (meth) acrylic acid, in which the homopolymer:silicate ratio by weight is between 2:8 and 8:2, advantageously between 3:7 and 7:3.

According to one embodiment of the present invention, the ternary mixture comprises a homopolymer of acrylic acid completely neutralized with sodium.

The person skilled in the art knows how to calculate the theoretical amount of base necessary for the complete neutralization of a homopolymer of acrylic acid of known molecular weight, taking into account the molecular weight of acrylic acid (72 g/mol).

For example, if a homopolymer of acrylic acid which has a molecular weight of 7 000 g/mol is used, the number of acid functional groups is deduced by calculation, i.e. approximately 97.2 mol of acid functional groups per mole of polymer. Thus, 97.2 mol of base are necessary to completely neutralize one mole of polymer.

In this scenario, at least an excess of 2 mol % (with respect to the 97.2 mol of base necessary for the complete neutralization of the polymer), i.e. 1.9 mol of base, is added to the silicate or metasilicate solution.

If an excess of 5 mol % of base, with respect to the theoretical amount of base necessary for the complete neutralization of the homopolymer, has to be added, 4.86 mol of excess base are then added.

The amount by weight of base to be added to the silicate or metasilicate solution is deduced by taking into account the molecular weight of the choice of the base used.

Alternatively, the person skilled in the art takes a measurement of the acid index of the polymer by acid/base titration. The acid index corresponds to the mass of base (expressed in mg of KOH) necessary to neutralize the acidity of one gram of polymer. It is subsequently possible, by calculation, to determine the theoretical amount of base necessary for the complete neutralization of the polymer and thus to calculate the excess of base to be added in order to prepare the agent according to the invention.

When the polymer is partially or completely neutralized, the person skilled in the art can use ion-exchange resins, which allow him to return to the acid form of the polymer. Alternatively, he carries out a back titration using a strong base, after addition of an excess of a strong acid, for example sulfuric acid.

Another object of the present invention relates to a method for the preparation of a dispersion and/or grinding aid agent of mineral materials in aqueous suspension, comprising the following stages:

a) a base is added to a solution of silicate chosen from the group consisting of sodium silicate of formula $Na_2O.nSiO_2$ (with n varying between 1 and 4), sodium metasilicate $Na_2SiO_3$, potassium silicate $K_2O.nSiO_2$ (with n varying between 1 and 4), potassium metasilicate $K_2SiO_3$ and a mixture of these compounds and b) a homopolymer or a copolymer of (meth)acrylic acid, partially or completely neutralized with sodium, with potassium, with lithium and/or with an amine, is introduced into the preceding mixture, said base being added in an amount such as to be in excess of at least 2 mol % with respect to the total number of moles of homopolymers or copolymers of (meth)acrylic acid.

According to one embodiment, the method for the preparation of a dispersion and/or grinding aid agent of kaolin in aqueous suspension is carried out with stirring at a temperature of between 5° C. and 50° C.

According to another embodiment, the method for the preparation of a dispersion and/or grinding aid agent of kaolin in aqueous suspension is carried out at a temperature of between 10° C. and 40° C., for example between 15° C. and 35° C.

Yet another object of the present invention lies in a method for the dispersion and/or grinding of kaolin, comprising a stage of dispersion and/or grinding of kaolin in aqueous suspension by means of said dispersion and/or grinding aid agent.

This agent is present in an effective amount in order to obtain an increased efficiency of dispersion and/or grinding, as determined by the person skilled in the art, for example by means of a deflocculation curve.

According to one embodiment, said agent is present in a proportion of between 0.01% and 10% by dry weight, with respect to the dry weight of the kaolin, for example between 0.1% and 5%.

Another object of the present invention relates to the use of a ternary mixture as described above to disperse particles of kaolin in solution.

Another object of the present invention relates to the use of a ternary mixture as described above to prepare a kaolin suspension.

Another object of the present invention relates to the use of a ternary mixture as described above as grinding and/or cogrinding aid agent of kaolin.

BRIEF DESCRIPTION OF THE DRAWINGS

FIG. 1 shows the results of the tests set forth in Example 7 wherein the x-axis is the dose of the agents (expressed in %) and the y-axis is the viscosity (expressed in mPa·s).

The examples which follow make it possible to achieve a better understanding of the present invention, without limiting the scope thereof.

EXAMPLES

In all of the examples which follow, use is made, as polymer of (meth)acrylic acid, of a polymer having the following characteristics and obtained by the method described below.

Characteristics of the Acrylic Acid Polymer

Molecular weight Mw (determined by SEC as indicated above): 2 900 g/mol

Molecular weight Mn (determined by SEC as indicated above): 1 320 g/mol

PI Index: 2.2

SC (Solids Content): 42% pH=8 (polymer completely neutralized NaOH)

Example 1

This example illustrates the preparation of an agent according to the method described in the patent U.S. Pat. No. 4,742,105 (test 1-1, prior art) and also the preparation of an agent according to the method of the present invention (test 1-2).

Test 1-1

354.9 g of polymer of acrylic acid (Mw=2 900 g/mol, Mn=1 320 g/mol, SC=42% by weight), completely neutralized with sodium hydroxide, and 98.4 g of sodium silicate of formula $Na_2O.2SiO_2$ (Vasil® 0112; SC: 50.5%) are mixed together with addition of 20 g of water.

Test 1-2

12.3 g of NaOH (20%) are added to 98.4 g of sodium silicate of formula $Na_2O.2SiO_2$ (Vasil® 0112; SC: 50.5%).

354.9 g of polymer of acrylic acid (Mw=2 900 g/mol, Mn=1 320 g/mol, SC=42% by weight), completely neutralized with sodium hydroxide, are subsequently added to the preceding mixture with addition of 20 g of water.

All the results have been combined in Table 1 below.

TABLE 1

| | Test 1-1 | | Test 1-2 | |
|---|---|---|---|---|
| Nasil ® 0112 | 98.4 g | 21.7% | 98.4 g | 21.1% |
| NaOH | 0 g | 0% | 12.3 g | 2.6% |
| Polymer | 354.9 g | 78.3% | 354.9 g | 76.3% |
| Water | 20 g | — | 20 g | — |
| Observations | Instantaneous precipitation | | — | |

A problem of immediate precipitation is found when the method described in the patent U.S. Pat. No. 4,742,105 is followed.

No immediate precipitation is found in the case of test 1-2.

Example 2

This example illustrates the use of different amounts of sodium hydroxide NaOH.

Test 2-1

26.4 g of sodium hydroxide NaOH (50%) are added to a solution of 274 g of sodium silicate of formula $Na_2O.2SiO_2$ (Vasil® 0112; SC: 50.5%).

328 g of polymer of acrylic acid (Mw=2 900 g/mol, Mn=1 320 g/mol, SC=42% by weight), completely neutralized with sodium hydroxide, are subsequently added to the preceding mixture with addition of 57.1 g of water.

This test corresponds to an excess of NaOH of 7.2 mol %.

Test 2-2

19.8 g of sodium hydroxide NaOH (50%) are added to a solution of 274 g of sodium silicate of formula $Na_2O.2SiO_2$ (Nasil® 0112; SC: 50.5%).

328 g of polymer of acrylic acid (Mw=2 900 g/mol, Mn=1 320 g/mol, SC=42% by weight), completely neutralized with sodium hydroxide, are subsequently added to the preceding mixture with addition of 57.1 g of water.

This test corresponds to an excess of NaOH of 5.4 mol %.

Test 2-3

13.2 g of sodium hydroxide NaOH (50%) are added to a solution of 274 g of sodium silicate of formula $Na_2O.2SiO_2$ (Vasil® 0112; SC: 50.5%).

328 g of polymer of acrylic acid (Mw=2 900 g/mol, Mn=1 320 g/mol, SC=42% by weight), completely neutralized with sodium hydroxide, are subsequently added to the preceding mixture with addition of 57.1 g of water.

This test corresponds to an excess of NaOH of 3.6 mol %.

All the results have been combined in Table 2 below.

TABLE 2

| | Test 2-1 | | Test 2-2 | | Test 2-3 | |
|---|---|---|---|---|---|---|
| Polymer | 328 g | 47.6% | 328 g | 48.2% | 328 g | 48.7% |
| NaOH | 26 g | 4.6% | 19.8 g | 3.5% | 13.2 g | 2.3% |
| Silicate | 274 g | 47.8% | 274 g | 48.3% | 274 g | 49.0% |
| Water | 57.1 g | — | 57.1 g | — | 57.1 g | — |
| SC (%) | 42.3% | | 42.2% | | 42.1% | |
| P/S ratio | 50/50 | | 50/50 | | 50/50 | |
| Sedimentation limit ambient temperature | >40 days | | 35 days | | 15 days | |

P/S ratio = polymer/silicate ratio by weight (dry weight)

Example 3

This example illustrates the use of different polymer/silicate ratios.

Test 3-1

26.4 g of sodium hydroxide NaOH (50%) are added to a solution of 137.2 g of sodium silicate of formula $Na_2O.2SiO_2$ (Vasil® 0112; SC: 50.5%).

492.7 g of polymer of acrylic acid (Mw=2 900 g/mol, Mn=1 320 g/mol, SC=42% by weight), completely neutralized with sodium hydroxide, are subsequently added to the preceding mixture with addition of 30.1 g of water.

Test 3-2

19.8 g of sodium hydroxide NaOH (50%) are added to a solution of 274 g of sodium silicate of formula $Na_2O.2SiO_2$ (Vasil® 0112; SC: 50.5%).

328 g of polymer of acrylic acid (Mw=2 900 g/mol, Mn=1 320 g/mol, SC=42% by weight), completely neutralized with sodium hydroxide, are subsequently added to the preceding mixture with addition of 57.1 g of water.

Test 3-3

26.4 g of sodium hydroxide NaOH (50%) are added to a solution of 411.7 g of sodium silicate of formula $Na_2O.2SiO_2$ (Nasil® 0112; SC: 50.5%).

164.2 g of polymer of acrylic acid (Mw=2 900 g/mol, Mn=1 320 g/mol, SC=42% by weight), completely neutralized with sodium hydroxide, are subsequently added to the preceding mixture with addition of 84.1 g of water.

All the results have been combined in Table 3 below.

TABLE 3

|  | Test 3-1 | Test 3-2 | Test 3-3 |
| --- | --- | --- | --- |
| Polymer | 492.7 g | 328 g | 164.2 g |
| NaOH | 26.4 g | 19.8 g | 26.4 g |
| Nasil ® 0112 | 137.2 g | 274 g | 411.7 g |
| Water | 30.1 g | 57.1 g | 84.1 g |
| SC (%) | 42.3% | 42.2% | 42.3% |
| P/S ratio | 75/25 | 50/50 | 25/75 |
| Sedimentation limit ambient temperature | 25 days | 34 days | >40 days |

P/S ratio = polymer/silicate ratio by weight (dry weight)

Example 4

This example illustrates the use of potassium hydroxide as base of the ternary mixture.

Test 4-1

88.2 g of KOH (50%) are added to a solution of 623.7 g of sodium silicate of formula $Na_2O.2SiO_2$ (Nasil® 0112; SC: 50.5%).

746.5 g of polymer of acrylic acid (Mw=2 900 g/mol, Mn=1 320 g/mol, SC=42% by weight), subsequently neutralized with sodium hydroxide, are subsequently added to the preceding mixture with addition of 129.8 g of water.

All the results have been combined in Table 4 below.

TABLE 4

|  | Test 4-1 |
| --- | --- |
| Nasil ® 0112 | 623.7 g |
| KOH | 88.2 g |
| Polymer | 746.5 g |
| Water | 129.8 g |
| SC (%) | 41.6% |
| P/S ratio | 50/50 |
| Sedimentation limit ambient temperature | >40 days |

P/S ratio = polymer/silicate ratio by weight (dry weight)

Example 5

This example illustrates the use of a polymer of acrylic acid with a molecular weight equal to 4 500 g/mol to prepare a dispersing and/or grinding aid agent according to the invention. It also illustrates the use of a polymer of acrylic acid with a molecular weight equal to 7 300 g/mol to prepare a grinding aid agent.

Test 5-1

44.1 g of KOH (50%) are added to a solution of 213.9 g of sodium silicate of formula $Na_2O.2SiO_2$ (Nasil® 0112; SC: 50.5%).

687.5 g of polymer of acrylic acid (Mw=4 500 g/mol, Mn=1 850 g/mol, SC=42%), completely neutralized with sodium hydroxide, are then added to the preceding mixture with addition of 54.5 g of water.

Test 5-2

43.1 g of NaOH (50%) are added to 406.2 g of sodium silicate of formula $Na_2O.2SiO_2$ (Nasil® 0112; SC: 50.5%).

540.5 g of polymer of acrylic acid (Mw=7 300 g/mol, Mn=2 700 g/mol, SC=38%), completely neutralized with sodium hydroxide, are then added to the preceding mixture with addition of 40.3 g of water.

All the results have been combined in Table 5 below.

TABLE 5

|  | Test 5-1 | Test 5-2 |
| --- | --- | --- |
| Nasil ® 0112 | 213.9 g | 406.2 g |
| KOH/NaOH | 44.1 g | 43.1 g |
| Polymer | 687.5 g | 540.5 g |
| Water | 54.5 g | 40.3 g |
| SC (%) | 42.2% | 42.2% |
| P/S ratio | 73/27 | 53/47 |
| Sedimentation limit ambient temperature | >40 days | <2 days |

P/S ratio = polymer/silicate ratio by weight (dry weight)

Example 6

This test illustrates the stability of a ternary mixture according to the invention under different conditions: after one week at a temperature of 50° C. and also after one or three freeze/thaw cycles.

More specifically, the freeze/thaw cycle consists in storing overnight in a freezer at a temperature of −18° C.

All the results are given in Table 6 below.

The viscosity (expressed in mPa·s) of each agent at 20° C. is measured with a viscometer of Brookfield DVIII type. The values of the viscosities shown are measured after stirring, at a speed of 100 rev/min.

The values of the viscosities under these extreme conditions are very particularly relevant for the purpose of evaluating the characteristics of the agent from the viewpoint of its storage and use in industrial methods.

Test 6

60 g of NaOH (50%) are added to 405 g of sodium silicate of formula $Na_2O.2SiO_2$ (Vasil® 0112; SC: 50.5%).

950 g of polymer of acrylic acid (Mw=2 900 g/mol, Mn=1 320 g/mol, SC=42% by weight), completely neutralized with sodium hydroxide, are then added to the preceding mixture with addition of 87 g of water.

TABLE 6

|  |  | Test 6 |
| --- | --- | --- |
| Stability at ambient temperature | | |
| Viscosity 100 rev/min | (mPa · s) | 118 |
| Stability after one week at 50° C. | | |
| Viscosity 100 rev/min | (mPa · s) | 114 |

TABLE 6-continued

| | Test 6 |
|---|---|
| Stability after one freeze/thaw cycle | |
| Viscosity 100 rev/min (mPa · s) | 104 |
| Stability after three freeze/thaw cycles | |
| Viscosity 100 rev/min (mPa · s) | 98 |

Example 7

This test illustrates the use of different ternary mixtures as dispersion aid agents of kaolin particles. Two kaolin suspensions are prepared from Capim® DG (Imerys) kaolin particles at a concentration of 70%, each containing a variable amount of the agent according to test 7-1 or according to test 7-2.

Test 7-1

50 g of NaOH (50%) are added to 497 g of sodium silicate of formula $Na_2O.2SiO_2$ (Vasil® 0112; SC: 50.5%).

630 g of polymer of acrylic acid (Mw=2 900 g/mol, Mn=1 320 g/mol, SC=42% by weight), completely neutralized with sodium hydroxide, are then added to the preceding mixture with addition of 110 g of water.

Test 7-2

60 g of NaOH (50%) are added to 405 g of sodium silicate of formula $Na_2O.2SiO_2$ (Vasil® 0112; SC: 50.5%).

950 g of polymer of acrylic acid (Mw=2 900 g/mol, Mn=1 320 g/mol, SC=42% by weight), completely neutralized with sodium hydroxide, are then added to the preceding mixture with addition of 87 g of water.

The two mixtures of tests 7-1 and 7-2 are used in a method for the dispersion of kaolin, comprising a stage of dispersion of kaolin in aqueous suspension. The viscosity of the suspension/dispersion of kaolin is measured according to the protocol given in example 6.

The effective amount of agents is determined by means of a deflocculation curve according to the protocol which follows.

An aqueous solution is prepared by weighing out a predetermined amount of water and of agents according to test 7-1 or according to test 7-2, in order to obtain a suspension of kaolin with a solids content of 70% containing 0.07% dry/dry of said agent, and the pH of this solution is adjusted to 8.

A predetermined amount of kaolin powder is introduced with stirring into this aqueous solution. Stirring is maintained for 15 minutes.

The Brookfield viscosity is measured at 100 rev/min.

The measurement is repeated with increasing doses of agents, namely 0.1%, 0.13%, 0.18% and 0.28%.

The results are presented in FIG. 1.

The invention claimed is:

1. A dispersion and/or grinding aid agent of kaolin in aqueous suspension, consisting of a ternary mixture of
    a) at least one homopolymer or copolymer of (meth) acrylic acid, partially or completely neutralized with sodium, potassium, lithium and/or an amine, wherein said homopolymer or copolymer of (meth)acrylic acid has a weight average molecular weight of less than or equal to 7000 g/mol, as measured by SEC,
    b) at least one solution of silicate or metasilicate selected from the group consisting of sodium silicate of formula $Na_2O.nSiO_2$ with n varying between 1 and 4, sodium metasilicate $Na_2SiO_3$, potassium silicate $K_2O.nSiO_2$ with n varying between 1 and 4, potassium metasilicate $K_2SiO_3$ and a mixture thereof, and
    c) at least one base, in an amount such that the at least one base is in excess of at least 2 mol % with respect to a theoretical amount of the base necessary for a complete neutralization of said homopolymer or copolymer of (meth)acrylic acid,
    wherein the homopolymer:copolymer:silicate/metasilicate ratio by dry weight is between 20:80 and 80:20.

2. The agent according to claim 1, wherein said homopolymer or copolymer of (meth)acrylic acid has the weight average molecular weight ranging from 1100 g/mol to 7000 g/mol measured by SEC.

3. The agent according to claim 1, wherein said homopolymer or copolymer of (meth)acrylic acid has a molecular weight of less than or equal to 6 000 g/mol, as measured by SEC.

4. The agent according to claim 1, wherein said homopolymer or copolymer of (meth)acrylic acid has a PI index of between 1.5 and 3.

5. The agent according to claim 1, wherein the amount of the at least one base is such that the at least one base is in excess of at least 5 mol % with respect to the theoretical amount of the base necessary for the complete neutralization of said homopolymer or copolymer of (meth)acrylic acid.

6. The agent according to claim 1, wherein b) is a solution of silicate, which is a sodium silicate of formula $Na_2O.2SiO_2$.

7. The agent according to claim 1, consisting of a ternary mixture of:
    a) from 20% to 80% by weight of said at least one homopolymer or copolymer of (meth)acrylic acid,
    b) from 20% to 80%₀ by weight of said at least one solution of silicate or metasilicate, and
    c) from 1% to 10% by weight of said at least one base.

8. A method for preparing the agent according to claim 1, the method comprising:
    adding the at least one base to the at least one solution of silicate or metasilicate, thereby obtaining a mixture; and
    introducing into the mixture the at least one homopolymer or copolymer of (meth)acrylic acid,
    wherein the at least one base is added in an amount such that the at least one base is in excess of at least 2 mol % with respect to a total number of moles of the at least one homopolymer or copolymer of (meth)acrylic acid.

9. The method according to claim 8, which is carried out with stirring at a temperature of between 5° C. and 50° C.

* * * * *